No. 689,299. Patented Dec. 17, 1901.
A. Z. GERMAINS.
SMOKE CONSUMING AND FUEL SAVING DEVICE.
(Application filed Sept. 15, 1900.)
(No Model.) 6 Sheets—Sheet 1.

Witnesses:
Clarence A. Bateman
Percy C. Bowen

Inventor:
A. Z. Germains
by Wilkinson & Fisher
Attorneys.

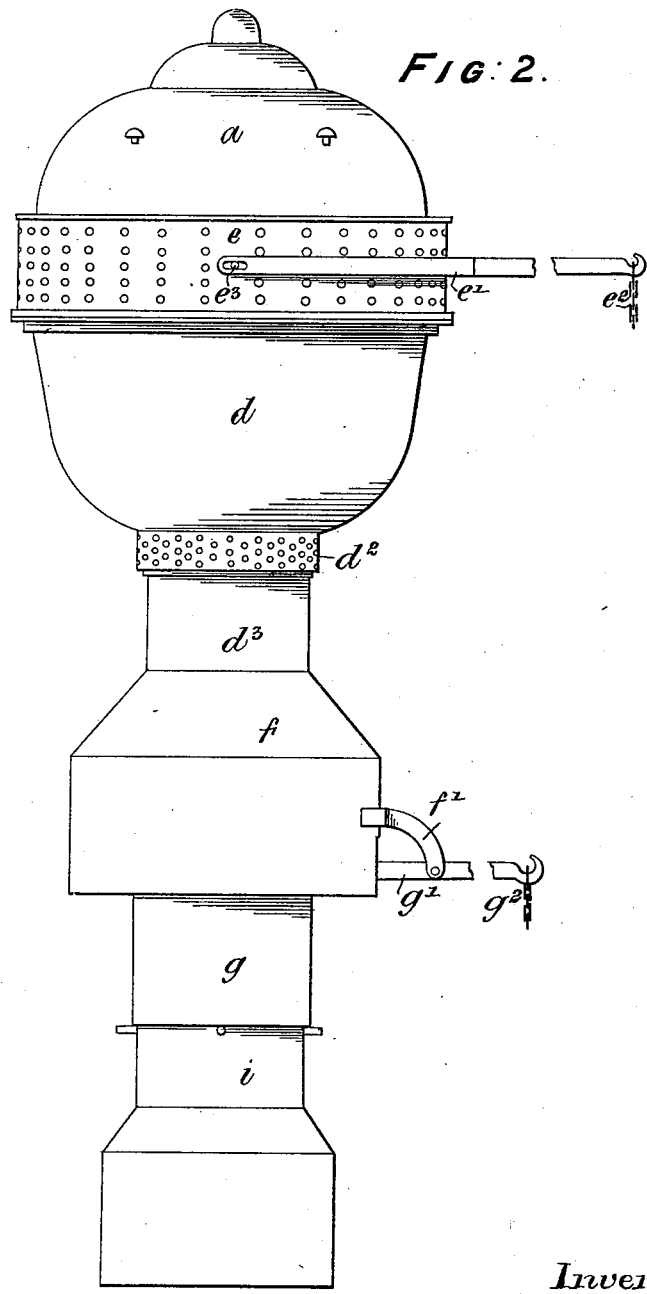

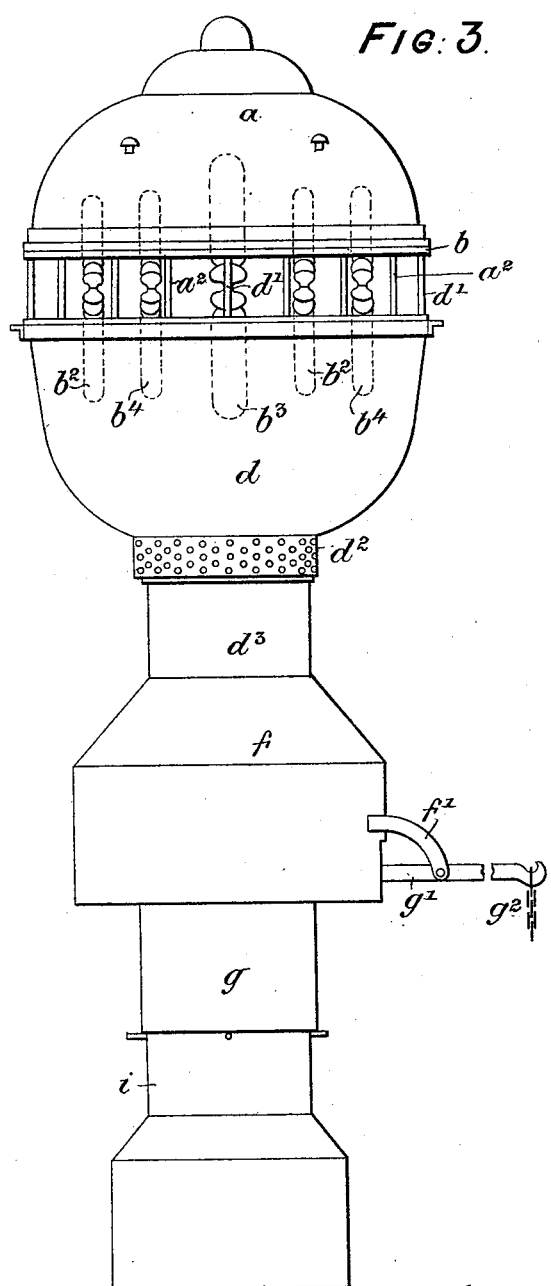

No. 689,299.  
Patented Dec. 17, 1901.
A. Z. GERMAINS.  
SMOKE CONSUMING AND FUEL SAVING DEVICE.  
(Application filed Sept. 15, 1900.)
(No Model.)  
6 Sheets—Sheet 4.
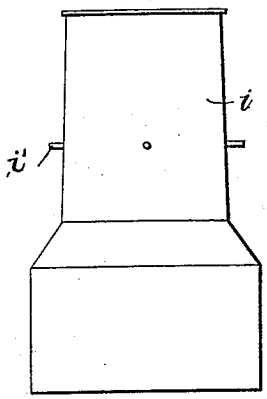
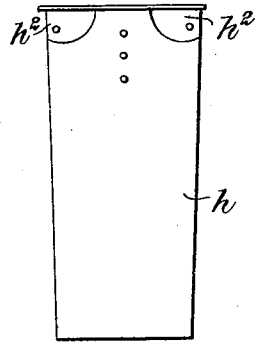
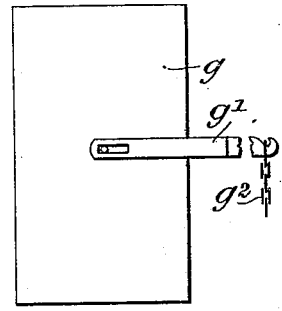
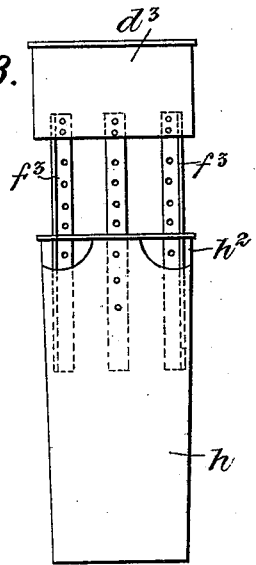
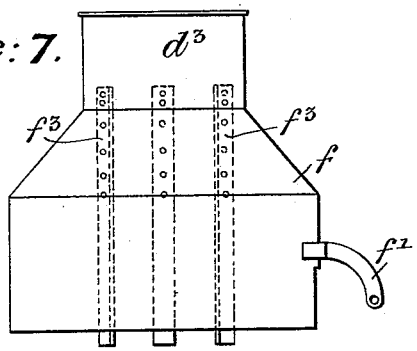
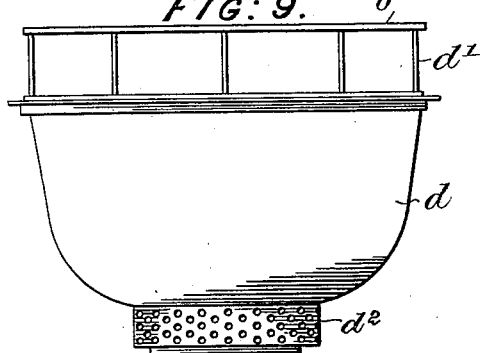
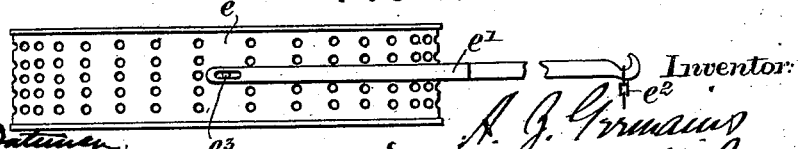

No. 689,299. Patented Dec. 17, 1901.
A. Z. GERMAINS.
SMOKE CONSUMING AND FUEL SAVING DEVICE.
(Application filed Sept. 15, 1900.)
(No Model.) 6 Sheets—Sheet 5.

No. 689,299. Patented Dec. 17, 1901.
A. Z. GERMAINS.
SMOKE CONSUMING AND FUEL SAVING DEVICE.
(Application filed Sept. 15, 1900.)
(No Model.) 6 Sheets—Sheet 6.

Witnesses
Inventor
A. Z. Germains
by Wilkinson & Fisher
Attorneys

UNITED STATES PATENT OFFICE.

ADOLPH Z. GERMAINS, OF LONDON, ENGLAND.

SMOKE-CONSUMING AND FUEL-SAVING DEVICE.

SPECIFICATION forming part of Letters Patent No. 689,299, dated December 17, 1901.

Application filed September 15, 1900. Serial No. 30,191. (No model.)

*To all whom it may concern:*

Be it known that I, ADOLPH ZALKIN GERMAINS, a subject of the Queen of Great Britain, residing at London, in the county of Middlesex, England, have invented certain new and useful Improvements in Smoke-Consuming and Fuel-Saving Devices, of which the following is a specification.

My invention relates to an attachment to be placed on the top of a chimney for the purpose of reducing the amount of smoke produced by the fire and consuming said smoke and saving the fuel.

With these objects in view my invention consists in the construction and combinations of parts, as hereinafter described and claimed.

Figure 1:
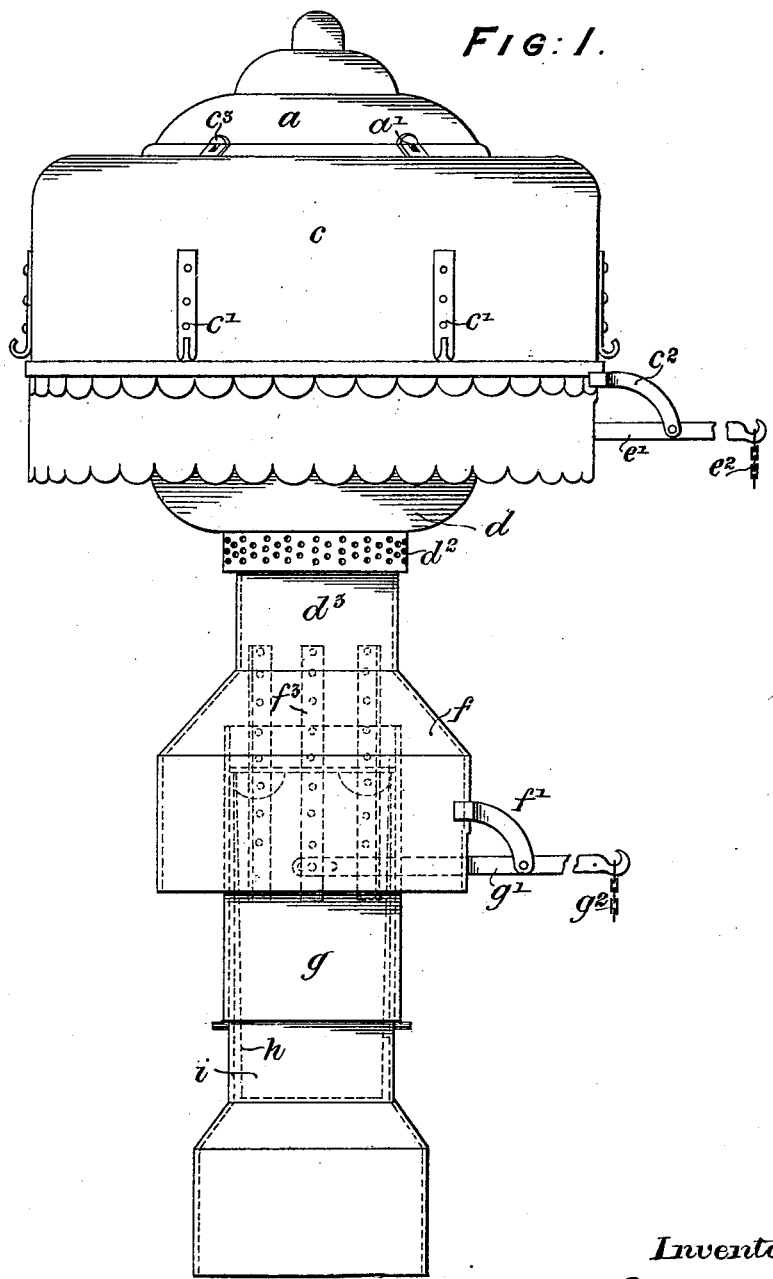
Figure 11:
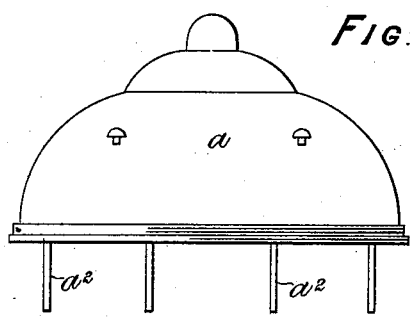
Figure 14:
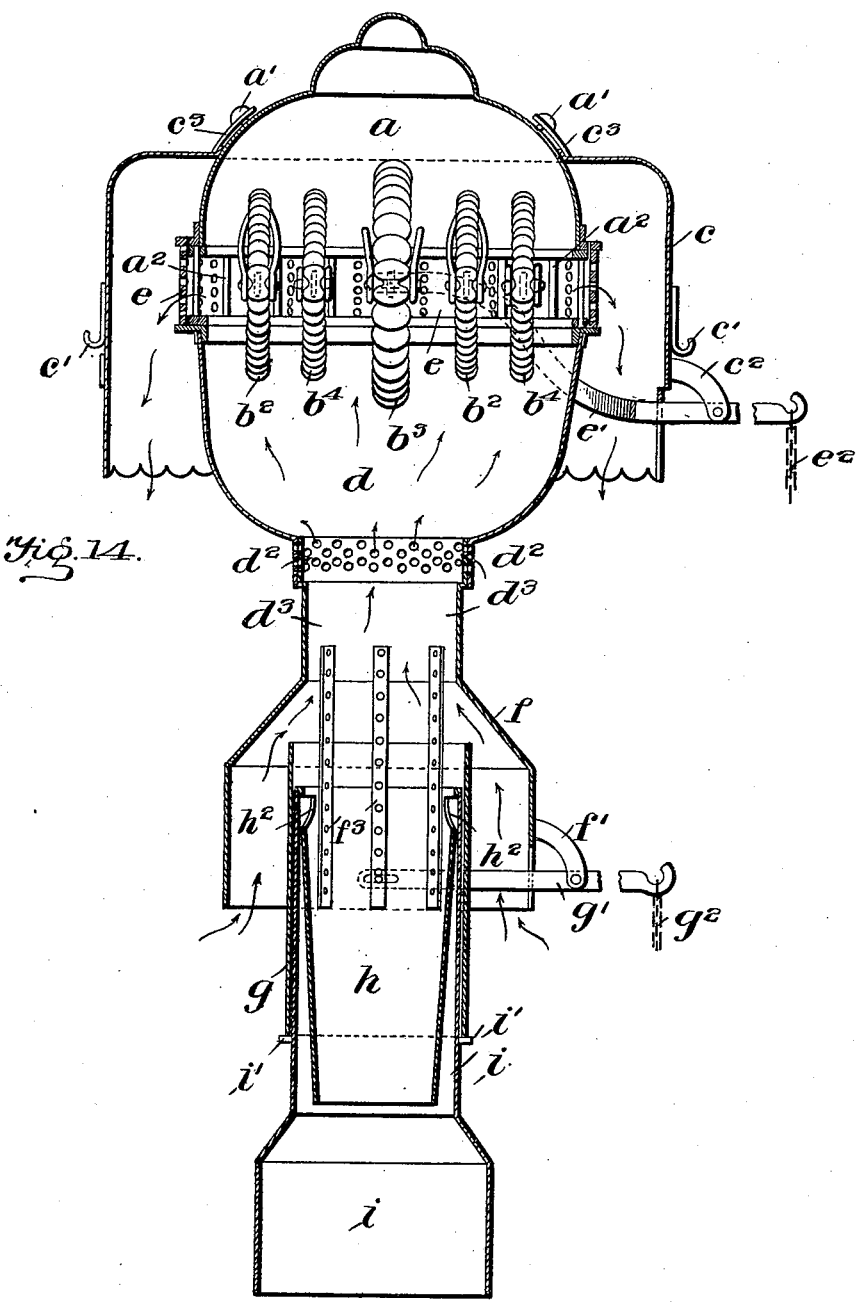

In the accompanying drawings, Figure 1 is a side elevation of my device. Fig. 2 is a similar view with the outer part removed. Fig. 3 is a similar view with still other parts removed. Figs. 4 to 13 are views of the various parts detached, Fig. 12 being a top plan view with the upper part of the device removed. Fig. 14 is a full-length vertical section showing all of the parts in place.

The upper part of the apparatus is formed of the parts $a$ and $d$, each of which is approximately hemispherical in shape, with their edges facing each other, but separated by bars $a^2$, leaving an open space between the parts $a$ and $d$. This open circular space is covered by a perforated damper $e$, connected by pins $e^3$ to the forked ends of the lever $e'$, arranged to be operated by a chain $e^2$ by an attendant below. The lever $e'$ is pivotally attached to a curved bracket $c^2$.

In actual use a hood or shield $c$ is placed over the upper part of the device, being attached to the part $a$ by slotted lips $c^3$ and buttons $a'$. In this hood there is of course a vertical slot in which the lever $e'$ may play. On the hood $c$ are hooks $c'$, to which stay-ropes may be fastened.

Below the part $d$ is a perforated damper $d^2$, which may be arranged to slide around the stem of the device, if desired, for the purpose of varying the draft. Below the damper $d^2$ is a pipe $d^3$, which expands downwardly, as shown at $f$, forming a bell-shaped chamber open at its lower end. Into this chamber projects the socket-tube $h$, slightly cut away at the top, as shown at $h^2$, and secured to the tube or pipe $d^3$ by means of bolts and stay-pieces $f^3$. Around the socket-tube $h$ is the sliding tube $g$, arranged to slide up around the tube $h$ and to entirely close the openings between the tubes $h$ and $d^3$, if desired. This tube $g$ is carried on the ends of a forked lever $g'$, adapted to be operated by the chain $g^2$ from below. The lever $g'$ is pivoted in a curved bracket $f'$, fastened to the part $f$. The tube $g$ is prevented from moving down too far by the pins $i'$ in the tube $i$, which is adapted to fit into or over the upper end of the chimney. The tube $h$ is slightly coned, the larger part being uppermost, so that it will fit into the tube $i$.

Figure 12:
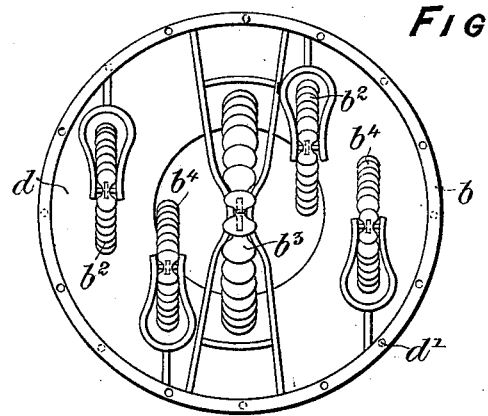
Figure 13:
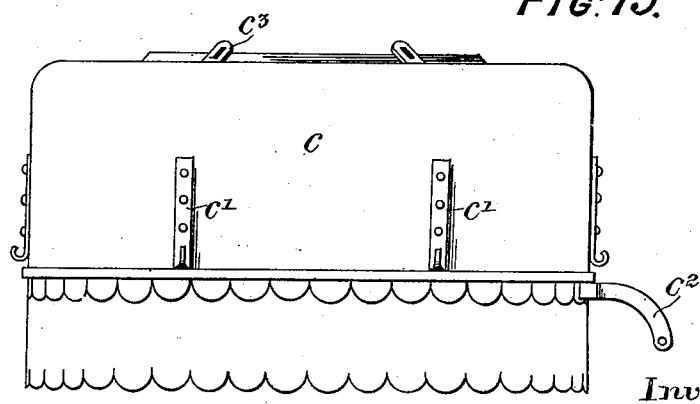

Within the part $d$ are arranged a series of fans, preferably five in number, as shown in Fig. 12. The largest fan $b^3$ is located in the center, and the other fans $b^2$ and $b^4$ are arranged in pairs, which, however, alternate with each other. On these fans are cup-shaped blades. By means of the fans and the adjustable dampers $e$, $d^2$, and $g$, together with the opening in the bottom of the pipe $f$, I am enabled to exactly regulate the draft, save fuel, and to a large extent prevent smoke. I am unable to give the exact scientific reasons; but I have found by experiment that these parts must be differently adjusted under varying conditions, such as the speed of movement of the boat, (provided this apparatus has been used on the smoke-stack of a boat,) the direction and intensity of the wind, the dampness of the atmosphere, &c. After an intelligent attendant, however, has received a little instruction he finds no difficulty whatever in regulating the apparatus.

Having thus described my invention, what I claim as new, and desire to secure by Letters Patent of the United States, is—

1. In a smoke-preventing and fuel-saving device, the combination of bell-shaped parts oppositely disposed and leaving an opening between them, of a perforated damper arranged over this opening, means for moving said damper, and a shield covering said damper but at a distance therefrom.

2. In a smoke-consuming and fuel-saving device, the combination of a tube adapted to fit into or over a chimney or smoke-stack, said tube being closed at the top but provided with a series of side openings, dampers for said openings, and means for operating said dampers.

3. In a smoke-consuming and fuel-saving device, the combination of a tube adapted to fit into or over a smoke-stack or chimney, said tube being closed at the top and provided with a series of side openings, dampers for said openings, means for adjusting said dampers, shields for said openings, and fans in the upper part of said tube.

4. In a smoke-consuming and fuel-saving device, the combination of a tube adapted to fit into or over a chimney or smoke-stack, said tube being provided with two side openings, an adjustable damper for each of said openings, means for moving said dampers, shields adapted to entirely cover said side openings, said shields being open at the bottom, and fans in the upper enlarged part of said tube.

ADOLPH Z. GERMAINS.

Witnesses:
M. DELAHAYE,
L. DELAHAYE.